(12) United States Patent
Yoshino

(10) Patent No.: US 9,126,330 B2
(45) Date of Patent: Sep. 8, 2015

(54) CARRIER DEVICE AND ROBOT SYSTEM

(75) Inventor: Katsuhiko Yoshino, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 710 days.

(21) Appl. No.: 13/470,356

(22) Filed: May 14, 2012

(65) Prior Publication Data

US 2013/0177370 A1     Jul. 11, 2013

(30) Foreign Application Priority Data

Jan. 11, 2012   (JP) ................................ 2012-003540

(51) Int. Cl.
  *B65H 1/00*    (2006.01)
  *B25J 9/00*    (2006.01)
  *B05B 13/02*   (2006.01)
  *B05B 13/04*   (2006.01)

(52) U.S. Cl.
  CPC ........... *B25J 9/0096* (2013.01); *B05B 13/0242* (2013.01); *B05B 13/0431* (2013.01)

(58) Field of Classification Search
  CPC .......................... B05B 13/0242; B25J 9/0096
  USPC ................................................... 414/223.01
  See application file for complete search history.

(56) References Cited

U.S. PATENT DOCUMENTS

| 4,644,897 A | 2/1987 | Fender |
| 4,764,077 A | 8/1988 | Susnjara |
| 8,894,343 B2 * | 11/2014 | Yoshino ................... 414/222.07 |

FOREIGN PATENT DOCUMENTS

| JP | 58-186581 | 10/1983 |
| JP | 04-29329 U | 3/1992 |
| JP | 2000-159338 | 6/2000 |
| JP | 4190631 B2 | 6/2000 |
| JP | 2007-229904 | 9/2007 |
| JP | 2008-221098 | 9/2008 |

OTHER PUBLICATIONS

Chinese Office Action for corresponding CN Application No. 201210153654.9, Oct. 10, 2014.
Japanese Office Action for corresponding JP Application No. 2012-003540, Dec. 3, 2013.
Extended European Search Report for corresponding EP Application No. 12168181.1-1712, Apr. 5, 2013.
Korean Office Action for corresponding KR Application No. 10-2012-0052905, Mar. 23, 2015.

* cited by examiner

*Primary Examiner* — Scott Lowe
(74) *Attorney, Agent, or Firm* — Mori & Ward, LLP

(57) ABSTRACT

A carrier device according to an embodiment includes a base that is disposed on an installation surface and a swivel arm that is provided on the base to swivel freely and of which turn tables attached to its both ends pass between a carrying in and out position and a working position that are previously set on a circular orbit. The base has a hollow structure and includes a hollow part that has at least therein the center of rotation of the swivel arm and into and through which a predetermined linear object can be inserted.

12 Claims, 5 Drawing Sheets

CARRIER DEVICE AND ROBOT SYSTEM

CROSS-REFERENCE TO RELATED APPLICATION

This application is based upon and claims the benefit of priority of the prior Japanese Patent Application No. 2012-003540, filed on Jan. 11, 2012, the entire contents of which are incorporated herein by reference.

FIELD

The embodiment discussed herein is directed to a carrier device and a robot system.

BACKGROUND

There is known a conventional carrier device that is provided on a base to swivel freely and is provided with a swivel arm of which turn tables, which are attached to its both ends to place thereon workpieces, pass between a carrying in and out position and a working position that are previously set on a circular orbit.

For example, an efficient automatic painting operation can be performed by combining the carrier device and a painting robot to construct a robot system.

The robot system can be a system that provides a robot on a carrier device in order to reduce an operating space determined by an operating range of a swivel arm of the carrier device, an arm of the robot, and the like (a space required to perform a predetermined operation by the robot and the carrier device) as much as possible.

The conventional technology has been known as disclosed in, for example, Japanese Patent No. 4190631.

However, because a robot system employing a carrier device disclosed in Japanese Patent No. 4190631 includes a motor that is provided in a base to rotate a turn table, a cable and the like for driving the robot are provided outside the base when the robot is provided on the carrier device.

In this case, if the robot is a painting robot, a hose and the like for supplying coating material to a painting nozzle provided on the leading end of an arm of the robot must be provided outside the base.

Under such circumstances, there is a possibility that a cable and the like interfere with the swivel arm to be not desirable for its operations and that the cable and the like bring about bad effects such as contortion. In order to avoid these problems, the cable must be provided outside the circular orbit of the leading end of the swivel arm. This leads to lengthen the cable beyond necessity. Moreover, this goes against a saving request for an installation space for reducing the operating space of the robot system as much as possible.

SUMMARY

A carrier device according to an aspect of an embodiment includes: a base that is disposed on an installation surface; and a swivel arm that is provided on the base to swivel freely and of which turn tables attached to its both ends pass between a carrying in and out position and a working position that are previously set on a circular orbit. The base has a hollow structure and includes a hollow part that has at least therein a center of rotation of the swivel arm and into and through which a predetermined linear object is inserted.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

A carrier device according to an embodiment includes: a base that is disposed on an installation surface; and a swivel arm that is provided on the base to swivel freely and of which turn tables attached to its both ends pass between a carrying in and out position and a working position that are previously set on a circular orbit. The base has a hollow structure and includes a hollow part that has at least therein a center of rotation of the swivel arm and into and through which a predetermined linear object is inserted.

Hereinafter, a carrier device and a robot system according to an embodiment of the present disclosure will be explained in detail with reference to the accompanying drawings. In addition, the embodiment disclosed below is not intended to limit the present invention.

Robot System

Figure 1:
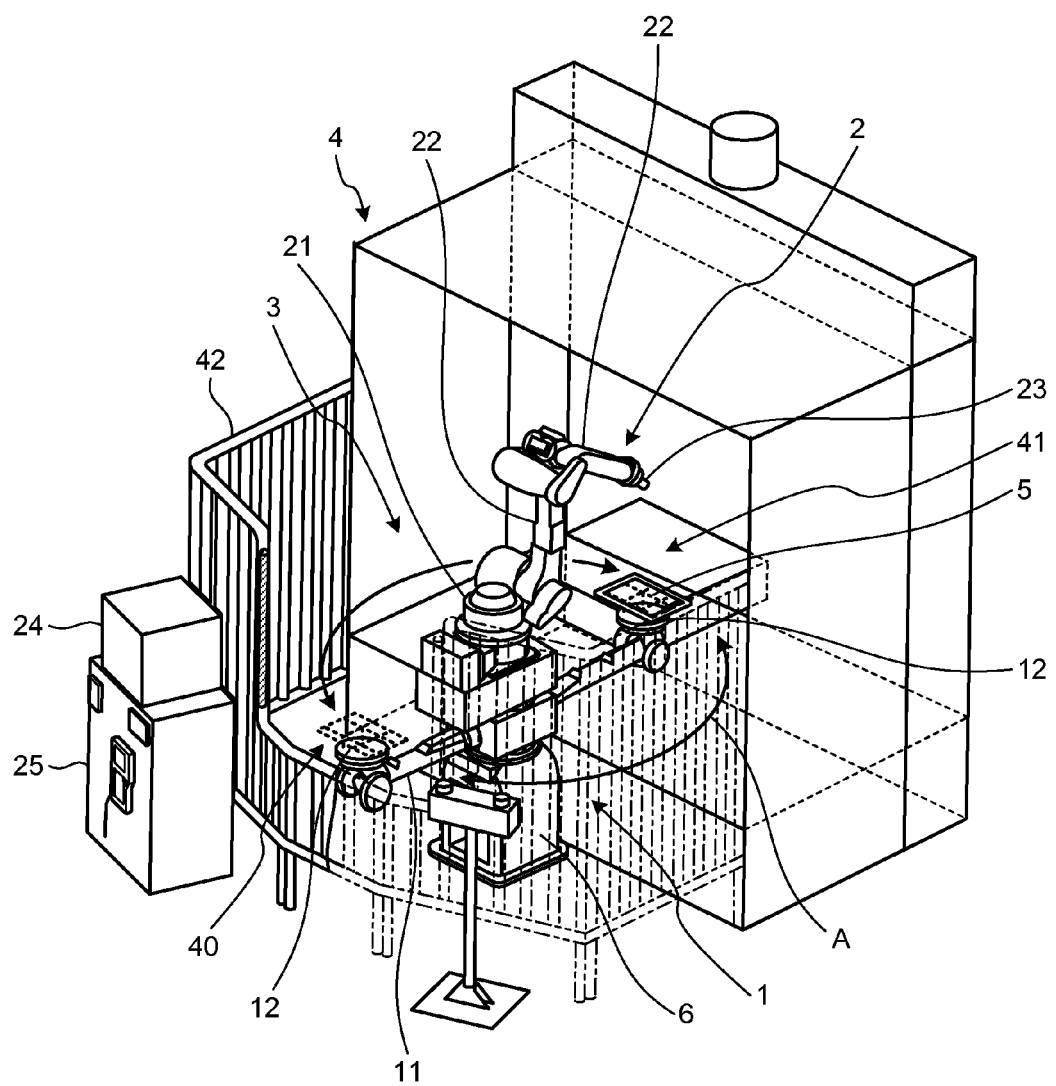
FIG. 1 is an explanation diagram illustrating a busy condition of a robot system according to an embodiment.
Figure 2:
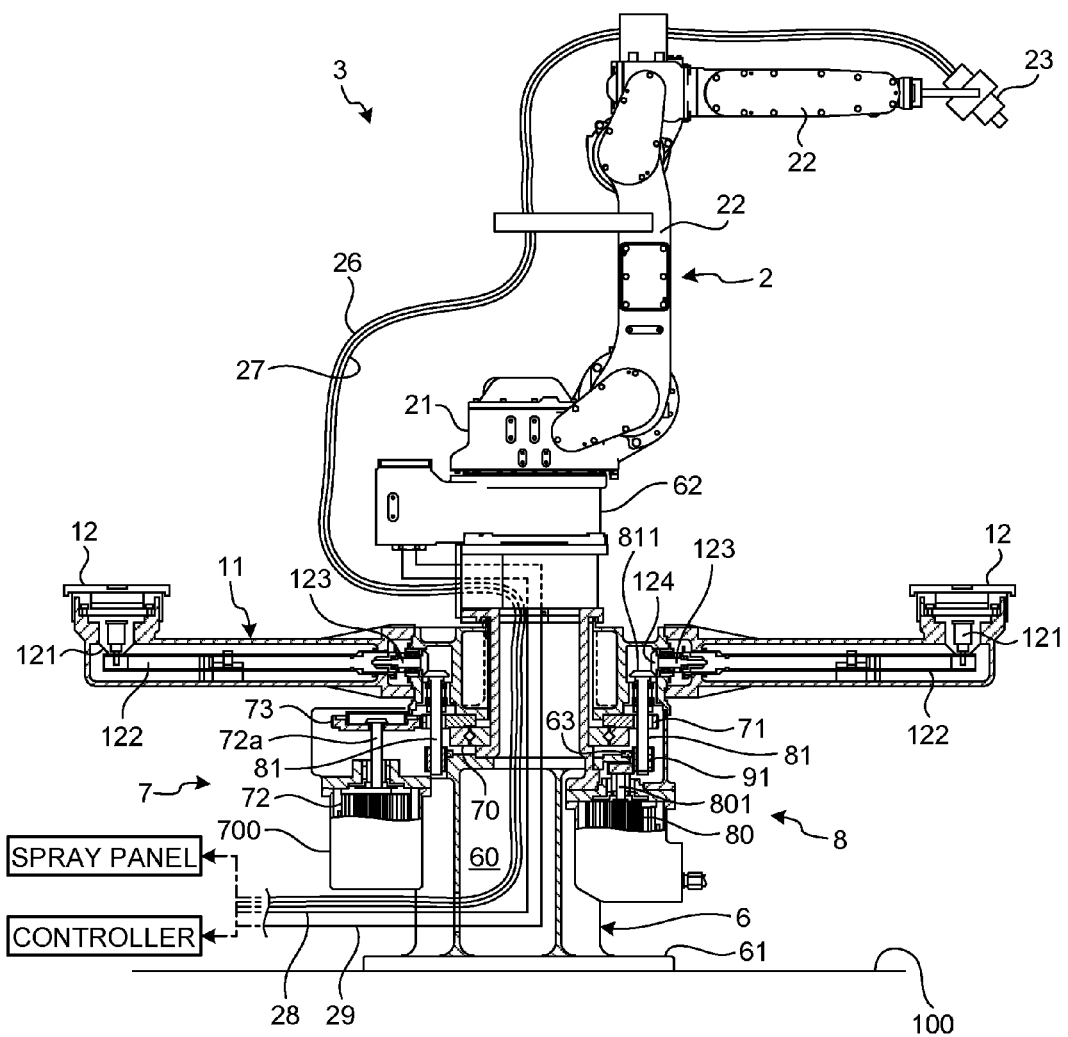
FIG. 2 is a partial cross-sectional view illustrating the robot system.

FIG. 1 is an explanation diagram illustrating a busy condition of a robot system 3 according to the embodiment. FIG. 2 is a partial cross-sectional view illustrating the robot system 3. First, a simple overview of the robot system 3 according to the present embodiment will be explained.

As illustrated in the drawings, the robot system 3 is constituted by combining a carrier device 1 that includes a swivel arm 11 and a working robot 2 that processes a workpiece 5. The robot system 3 is placed inside a working booth 4.

The working robot 2 used in the robot system 3 according to the present embodiment is an industrial robot and is integrally attached to the carrier device 1 at its substantially middle position as illustrated in FIG. 2.

In other words, a base part 21 is attached on the substantial center position of rotation of the swivel arm 11 of the carrier device 1, and a robot arm 22 having a plurality of joints is extended from the base part 21. Moreover, it is assumed that the working robot 2 according to the present embodiment has six joint axes. Herein, the number of axes is only an example. Therefore, the number of axes is not limited to six axes.

The robot system 3 according to the present embodiment paints the surface of the workpiece 5 that is a painted object. Therefore, a spray nozzle 23 is attached to the leading end of the robot arm 22 as an end effector. Moreover, the working robot 2 can perform various work operations by changing the end effector.

As illustrated in FIG. 1, in the internal space of the working booth 4, a carrying in and out position 40 at which the unprocessed workpiece 5 is supplied and the paint-processed workpiece 5 is taken out and a working position 41 at which a painting process is performed by the working robot 2 are previously set on a circular orbit A corresponding to a swiveling trajectory of the swivel arm 11. The carrier device 1 will be below explained in detail. In the present drawing, a reference number 42 indicates a safety fence that walls off the working booth 4.

The robot system 3 according to the present embodiment further includes a spray panel 24 that supplies predetermined coating material and air to the spray nozzle 23 and a controller 25 that controls to drive the robot system 3. Moreover, although it is omitted in FIG. 1, a coating material hose 26 is connected between the spray nozzle 23 and the spray panel 24, and the working robot 2 and the controller 25 are connected through electric cables 27, 28, and 29.

The spray panel 24 houses a coating material supplying device, which supplies predetermined coating material and air to the spray nozzle 23 through the coating material hose 26 that is a linear object, and an air supplying device, which supplies air to make the spray nozzle 23 spray coating material.

The controller 25 stores a working program that includes an injection time at which the spray nozzle 23 sprays coating material or air and by which the carrier device 1 and the working robot 2 are driven to perform setting operations.

The carrier device 1 includes a base 6 that is disposed on an installation surface 100 and the swivel arm 11 that is provided on the base 6 to swivel freely and of which turn tables 12 attached to its both ends pass between the carrying in and out position 40 and the working position 41 that are previously set on the circular orbit A.

In other words, the turn tables 12 and 12, which are attached to both the leading ends of the swivel arm 11 formed substantially linearly, can revolve along the circular orbit A to pass between the carrying in and out position 40 and the working position 41 that are previously set on the circular orbit A.

Each of the turn tables 12 and 12 is constituted to be able to rotate on its axis in a horizontal direction in the state where the workpiece 5 is placed thereon at the mounting position of the swivel arm 11. In the present embodiment, the carrier device 1 is controlled in such a manner that the swivel arm 11 is stopped when both the leading ends of the swivel arm 11 are located at the carrying in and out position 40 and the working position 41 and that only the turn table 12 located at the working position 41 rotates on its axis.

Moreover, although it is described below in detail, the base 6 of the carrier device 1 according to the present embodiment has a hollow structure and includes a hollow part 60 that has at least therein the center of rotation of the swivel arm 11. Herein, predetermined linear objects, namely, the first electric cable 27, the second electric cable 28, and the third electric cable 29 for the working robot, and further the coating material hose 26, and the like can be inserted into through the hollow part 60.

A swivel time of the swivel arm 11 and a rotation time of the turn table 12 can be controlled by the working program stored in the controller 25 as described above.

The robot system 3 that employs the configuration does not require that the first electric cable 27, the second electric cable 28, the third electric cable 29, the coating material hose 26, and the like are provided outside the circular orbit A of the swivel arm 11. Therefore, an operating space of the robot system 3 can be reduced as much as possible.

Moreover, the workpiece 5 can be placed on one side of the turn tables 12 and 12 at the carrying in and out position 40, and then the workpiece 5 can be carried to the working position 41 by swiveling the swivel arm 11 by 180 degrees to perform a painting operation at the working position 41. Then, the whole of the workpiece 5 having a three-dimensional surface can be evenly painted by horizontally rotating the turn table 12 at the position during the painting operation.

When a work operation is performed at the working position 41, the unprocessed workpiece 5 to be painted next is placed on the turn table 12 located at the carrying in and out position 40. When the painting operation is terminated at the working position 41, the workpiece 5 is carried to the carrying in and out position 40 by further swiveling the swivel arm 11 by 180 degrees to take out the processed workpiece 5 on which painting is completed. At this time, the turn table 12 on which the unprocessed workpiece 5 previously placed at the carrying in and out position 40 is placed is located at the working position 41.

In this way, the robot system 3 according to the present embodiment can effectively perform a painting operation in accordance with the working program. Moreover, even if the painting surface of the workpiece 5 is a three-dimensional shape with concavity and convexity, a painting process can be performed on the workpiece to have a uniform painting film thickness.

Herein, the workpiece 5 includes, for example, a chassis of a mobile phone, a chassis of a personal computer, and an instrument panel of an automobile. In this regard, however, if a workpiece should be painted and can be placed on the turn tables 12 and 12 of the carrier device 1 to be described below, the workpiece 5 may be any workpiece.

Carrier Device

Figure 3A:
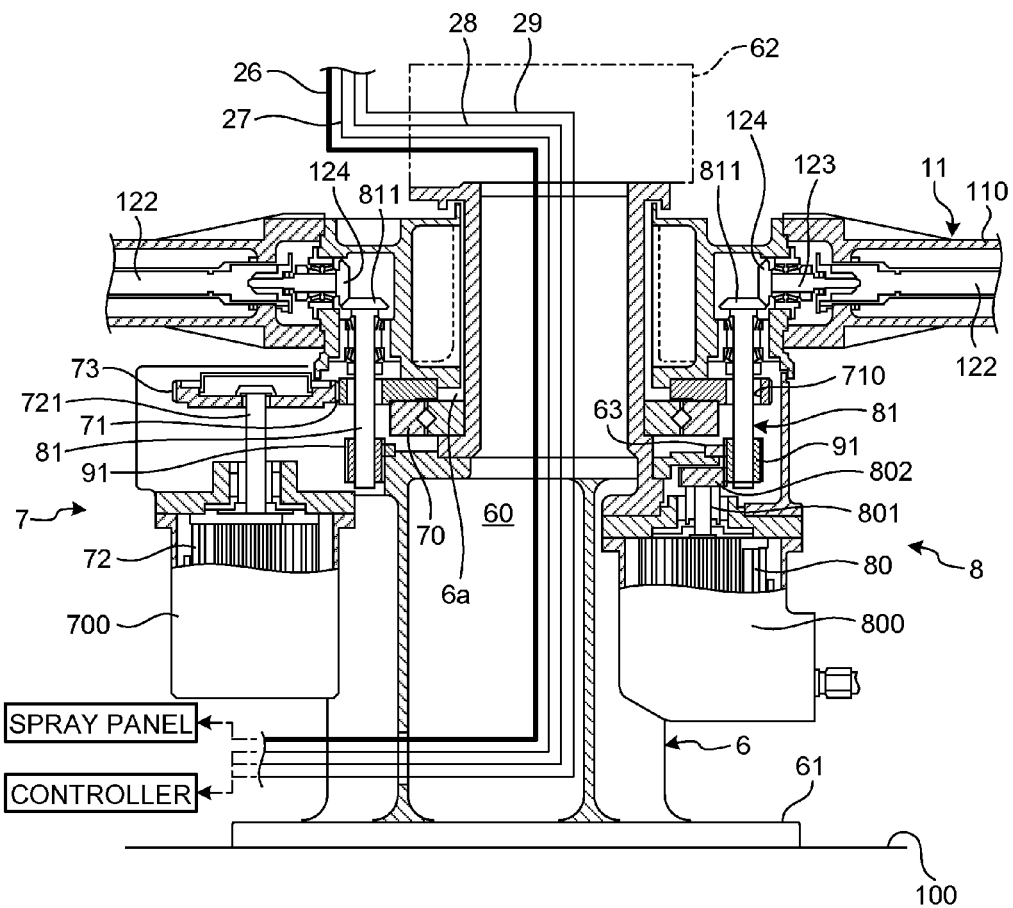
FIG. 3A is a cross-sectional view illustrating substantial parts of a carrier device according to the embodiment.
Figure 3B:
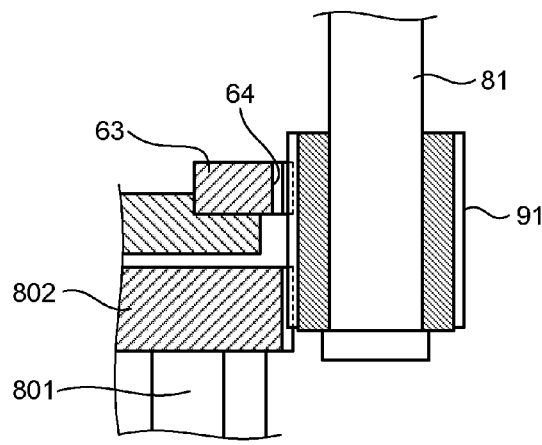
FIG. 3B is an explanation diagram obtained by expanding a part of the substantial parts.
Figure 4:
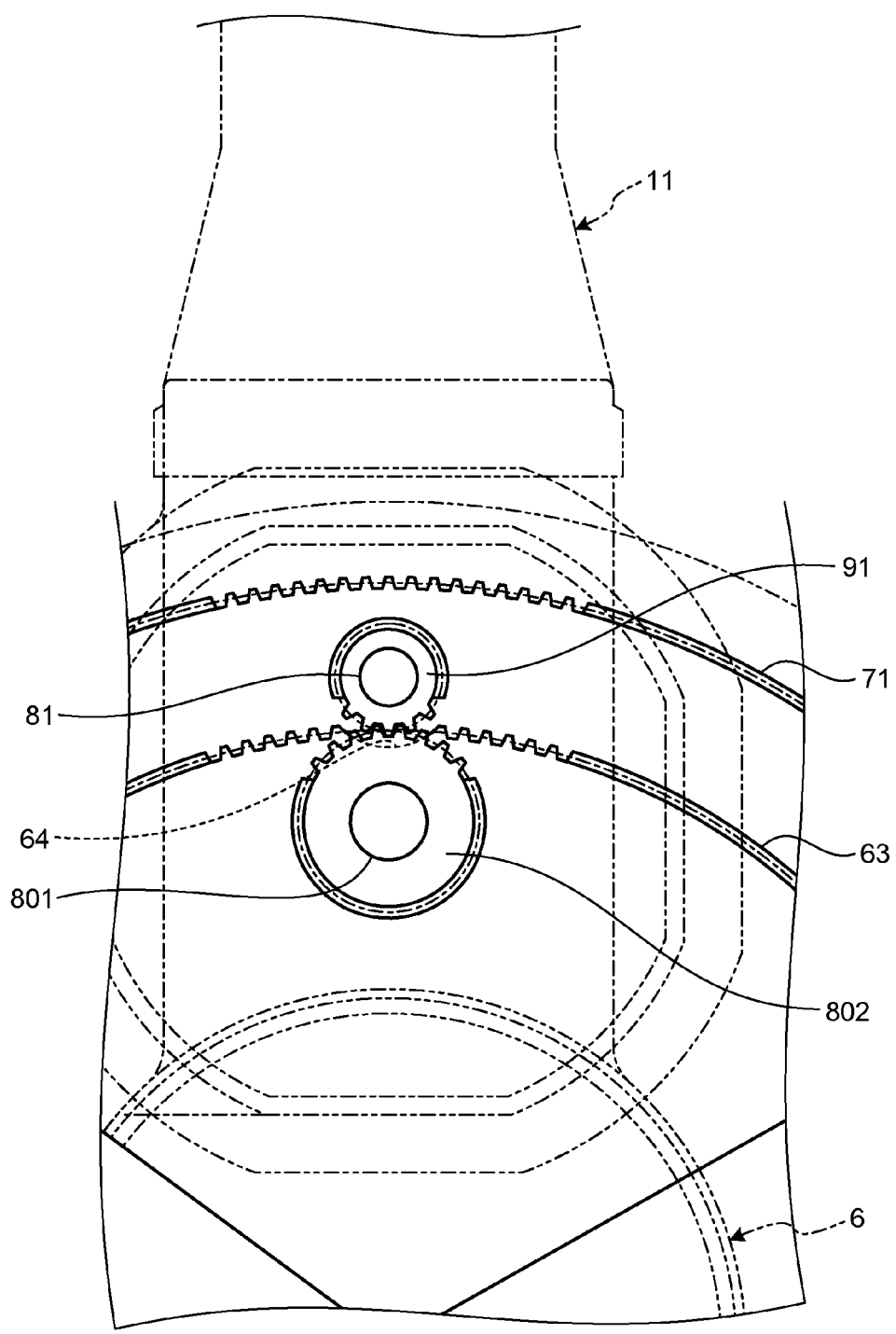
FIG. 4 is a plan view illustrating a state in which one side of a swivel arm is located at a working position.
Figure 5:
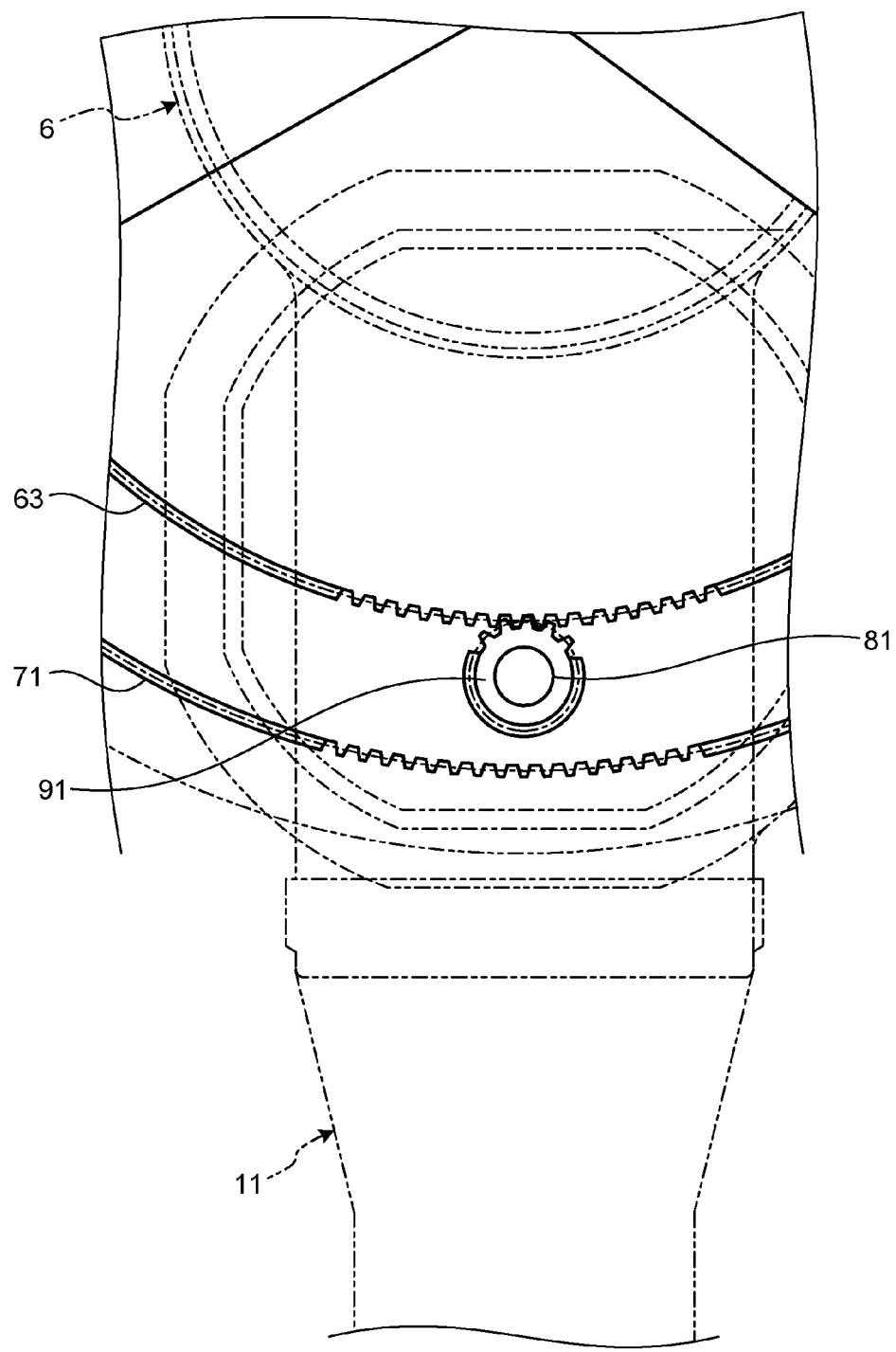
FIG. 5 is a plan view illustrating a state in which the one side of the swivel arm is located at a position other than the working position.

Next, the carrier device 1 of the robot system 3 according to the present embodiment will be more specifically explained with reference to FIGS. 2 to 5. FIG. 3A is a cross-sectional view illustrating substantial parts of the carrier device 1 according to the present embodiment. FIG. 3B is an explanation diagram obtained by expanding a part of the substantial parts. FIG. 4 is a plan view illustrating a state in which one side of the swivel arm 11 is located at the working position. FIG. 5 is a plan view illustrating a state in which the one side of the swivel arm 11 is located at a position other than the working position.

As illustrated in FIGS. 2 and 3A, the carrier device 1 includes the swivel arm 11 that is rotatably attached to and around the tubular base 6 via a swiveling mechanism 7. Herein, the base 6 includes an installation base 61 that is provided at its lower end and a robot mounting base 62 that is provided at its upper end.

In other words, the swivel arm 11 is attached to a cross roller 70, which is a bearing that is concatenated to an arm support circumference surface 6a of the base 6, and linearly extends with a central focus on the base 6. A pair of the turn tables 12 and 12 is attached to both ends of the swivel arm.

The swiveling mechanism 7 swivels the swivel arm 11 in such a manner that the turn tables 12 and 12 revolve around the base 6. Moreover, a swivel motor 72 can be controlled to stop by using the working program whenever an arm swivel ring gear 71 rotates 180 degrees.

In this way, the swivel arm 11 can turn around the circular orbit A to make the turn tables 12 and 12 provided on both the leading ends pass between the carrying in and out position 40 and the working position 41 that are located to be faced with each other while placing the base 6 therebetween, in which the turn tables are being stopped at the both positions for a predetermined time.

The swiveling mechanism 7 includes the swivel motor 72 and the arm swivel ring gear 71. The swivel motor 72 is a first power source. The arm swivel ring gear 71 is coupled with the swivel motor 72 in an interlocking manner and is rotatably attached on the outer circumferential surface of the base 6 via the cross roller 70, in which the swivel arm 11 is also attached on the outer circumferential surface.

The swivel motor 72 is attached outside the base 6. More specifically, when the carrier device 1 is placed inside the working booth 4, the swivel motor 72 is attached at a side close to the carrying in and out position 40 outside the base 6. Moreover, in the present drawing, a reference number 700 indicates a motor case that houses the swivel motor 72.

A drive gear 73 that is connected to an output shaft 721 of the swivel motor 72 is engaged with the arm swivel ring gear 71. In other words, the power for rotating the swivel arm 11 is supplied like "the swivel motor 72->the output shaft 721->the drive gear 73->the arm swivel ring gear 71->the swivel arm 11" in the swiveling mechanism 7.

By employing this configuration, when the swivel motor 72 is driven, the arm swivel ring gear 71 rotates and thus the swivel arm 11 rotates while its leading end draws a swiveling trajectory. In other words, the turn tables 12 and 12 that are respectively attached to both ends of the swivel arm 11 move along the circular orbit A between the carrying in and out position 40 and the working position 41. In this way, the workpiece 5 placed on the turn table 12 can be carried from the carrying in and out position 40 to the working position 41, or from the working position 41 to the carrying in and out position 40.

Each of the turn tables 12 and 12 is constituted rotatably in a horizontal direction at the leading end of the swivel arm 11, namely, at a mounting position. Moreover, the carrier device 1 includes a table rolling mechanism 8 that selectively rotates one of the two turn tables 12 and 12 at the mounting position. Therefore, the turn table 12 is constituted to revolve along the circular orbit A and to rotate on its axis in a horizontal direction in a state in which the workpiece 5 is placed thereon.

Next, the table rolling mechanism 8 that rotates the turn table 12 will be explained. The table rolling mechanism 8 includes a first in-case rotation shaft 121 and a second in-case rotation shaft 122 that are housed in an arm case 110 of the swivel arm 11.

In other words, as illustrated in FIGS. 2 and 3A, the first in-case rotation shaft 121 is directly connected to the turn table 12 and extends perpendicularly. On the other hand, the second in-case rotation shaft 122 horizontally extends inside the arm case 110, in which its bottom end is coupled with the first in-case rotation shaft 121 in an interlocking manner and its leading end is connected to a transmission shaft 123 that is provided with a secondary bevel gear 124.

As illustrated in the drawing, the table rolling mechanism 8 further includes a table rotation motor 80 that acts as a second power source and a primary table rotation shaft 81 that can be coupled with the table rotation motor 80 in an interlocking manner.

When the carrier device 1 is placed inside the working booth 4, the table rotation motor 80 is attached at a side close to the working position 41 outside the base 6. In FIGS. 2 and 3A, a reference number 800 indicates a case that houses the table rotation motor 80.

The primary table rotation shaft 81 is inserted into a through-hole 710 provided in the arm swivel ring gear 71 to rotate (revolve) around the base 6 along with the swivel arm 11. The leading end of the primary table rotation shaft 81 is provided with a primary bevel gear 811 that is engaged with the secondary bevel gear 124.

On the other hand, the bottom end of the primary table rotation shaft 81 is provided with an intermediate gear 91 that can be engaged with a guiding ring gear 63 fixed on the outer circumferential surface of the base 6 and is coupled with, in an interlocking manner, a rotating shaft 801 of the table rotation motor 80 that acts as the second power source.

In this case, two pairs of the first in-case rotation shaft 121, the second in-case rotation shaft 122, the transmission shaft 123, and the primary table rotation shaft 81 are provided in the table rolling mechanism 8 described above in such a manner that the respective components of two pairs are located at symmetrical positions while placing the base 6 therebetween.

In the table rotation motor 80 as the second power source that is singly provided at the side close to the working position 41 of the base 6, the rotating shaft 801 extends upward. Therefore, when the primary table rotation shaft 81 is located at the working position 41, the lower portion of the tubular intermediate gear 91 provided at the bottom end of the primary table rotation shaft 81 and an output gear 802 provided at the leading end of the rotating shaft 801 of the table rotation motor 80 are engaged with each other at this time.

Moreover, because the upper portion of the intermediate gear 91 is engaged with the guiding ring gear 63, the intermediate gear 91 rotates (revolves) along with the swivel arm 11 while being engaged with the guiding ring gear 63 when the arm swivel ring gear 71 rotates to rotate the swivel arm 11.

In other words, the primary table rotation shaft 81 rotates (revolves) along with the swivel arm 11. Moreover, although it is described below, unless the primary table rotation shaft 81 is located at the working position 41 during revolution, the table rotation motor 80 is constituted so that its power is not transmitted to the turn table 12.

It is natural that, when one side of the turn tables 12 and 12 is located at the working position 41, the other side of the turn tables 12 and 12 of the swivel arm 11 is located at the carrying in and out position 40. The turn table 12 that is located at the carrying in and out position 40 does not rotate (rotate on its axis) at the position because the intermediate gear 91 of the primary table rotation shaft 81 coupled with the turn table 12 is mechanically engaged with the guiding ring gear 63.

In this way, the table rolling mechanism 8 can make the turn table 12 selectively rotate on its axis at the mounting position. In other words, the components of the table rolling mechanism 8, in which the table rotation motor 80 is excepted, rotate (revolve) around the base 6 along with the swivel arm 11. When one side of the turn tables 12 and 12 of the swivel arm 11 is located at the working position 41, the corresponding turn table 12 is coupled with the table rotation motor 80 in an interlocking manner at this time.

In other words, the rotation power of the turn table 12 in the table rolling mechanism 8 is transmitted as described below on condition that one side of the turn tables 12 and 12 of the swivel arm 11 is located at the working position 41.

The rotation power of the turn table 12 is supplied like "the table rotation motor 80->the rotating shaft 801->the output gear 802->the intermediate gear 91->the primary table rotation shaft 81->the primary bevel gear 811->the secondary bevel gear 124->the transmission shaft 123->the second in-case rotation shaft 122->the first in-case rotation shaft 121->the turn table 12".

In the present embodiment of the configuration, as illustrated in FIGS. 3B and 4, a circular arc-shaped cutout portion 64 is formed at the position that faces the working position 41 on the peripheral border of the guiding ring gear 63 fixed to the base 6.

In other words, if the swivel arm 11 stops its rotation when one of the turn tables 12 and 12 is located at the working position 41, the intermediate gear 91 of the primary table rotation shaft 81 that revolves around the base 6 along with the swivel arm 11 is engaged with the output gear 802 of the table rotation motor 80. On the other hand, because the intermediate gear 91 that is engaged with the guiding ring gear 63 to revolve around the base is located at the cutout portion 64, the intermediate gear 91 comes free from engaging with the guiding ring gear 63. FIG. 3B is a cross-sectional view illustrating the situation. FIG. 4 is a plan view thereof.

Therefore, when the swivel motor 72 of the swiveling mechanism 7 is stopped at the time at which one side of the turn tables 12 and 12 of the swivel arm 11 is located at the working position 41 in accordance with the working program, the swivel arm 11 stops rotating around the base 6. In this state, if the table rotation motor 80 is driven in accordance with the working program, the power provided from the table rotation motor 80 is transmitted to the turn table 12 via the intermediate gear 91 as indicated by the power transmission path described above and thus can rotate the turn table 12 (the turn table 12 can rotate on its axis). While the turn table 12 is rotating, the working robot 2 performs a painting operation on the workpiece that is placed on the turn table to be rotated.

Then, after the painting operation is terminated by the passage of a predetermined time, the table rotation motor 80 is stopped in accordance with the working program. On the other hand, if the swivel motor 72 of the swiveling mechanism 7 is driven to again start rotating the swivel arm 11 in accordance with the working program, the intermediate gear 91 of the primary table rotation shaft 81 comes free from engaging with the output gear 802 of the table rotation motor 80. Then, the intermediate gear moves from the cutout portion 64 to be again engaged with the guiding ring gear 63, and thus starts revolving around the base 6 in conjunction with the rotation of the swivel arm 11. FIG. 5 illustrates a state in which the primary table rotation shaft 81 is located at a position other than the working position 41. In this case, the intermediate gear 91 rotates (revolves) along with the swivel arm 11 while being engaged with the guiding ring gear 63.

As described above, in the robot system 3 according to the present embodiment, the base 6 of the carrier device 1 has the hollow structure and includes the hollow part 60 that has at least therein the center of rotation of the swivel arm 11. The first electric cable 27, the second electric cable 28, and the third electric cable 29 for the robot, and further the coating material hose 26 can be inserted into through the hollow part 60.

Therefore, the cables (the first to third electric cables 27 to 29 and the coating material hose 26) do not interfere with the swivel arm 11 and thus do not absolutely bring about obstacles to the operation of the swivel arm 11. Moreover, there is not a possibility that the cables cause a bad influence such as contortion.

Moreover, because the cables are provided inside the base 6 instead of the outside of the circular orbit A of the swivel arm 11, the lengths of the cables are reduced and thus the operating space of the robot system 3 can be reduced as much as possible.

Moreover, the carrier device 1 of the robot system 3 according to the present embodiment includes the swiveling mechanism 7 that swivels the swivel arm 11 in such a manner that the turn tables 12 and 12 revolve around the base 6. Furthermore, the carrier device 1 includes the table rolling mechanism 8 that makes the turn tables 12 and 12 selectively rotate on its axis at the mounting position.

The swiveling mechanism 7 is configured to include the swivel motor 72 that is the first power source and the arm swivel ring gear 71 that is coupled with the swivel motor 72 in an interlocking manner and is rotatably attached on the outer circumferential surface of the base 6 along with the swivel arm 11.

On the other hand, the table rolling mechanism 8 is configured to include the table rotation motor 80 that is placed at the side close to the working position 41 as the second power source and the primary table rotation shaft 81 that swivels along with the swivel arm 11. In the primary table rotation shaft 81, its leading end can be coupled with the turn table 12 in an interlocking manner and its bottom end can be engaged with the guiding ring gear 63 fixed on the outer circumferential surface of the base 6. Moreover, the primary table rotation shaft 81 is provided with the intermediate gear 91 that is coupled with the rotating shaft 801 of the table rotation motor 80 in an interlocking manner.

Furthermore, the cutout portion 64 that comes free from engaging with the intermediate gear 91 is formed on the portion of the guiding ring gear 63 close to the working position 41. The primary table rotation shaft 81 located at the side close to the working position 41 transmits the output of the table rotation motor 80 to the turn table 12 while idling the intermediate gear 91 inside the cutout portion 64.

In this way, because the power source that makes the pair of the turn tables 12 and 12 selectively rotate on its axis is realized by the single table rotation motor 80, cost reduction can be achieved.

Moreover, the mechanism that switches power transmission into one from among the two turn tables 12 and 12 has a simple configuration that the guiding ring gear 63 is provided with the cutout portion 64. Therefore, cost reduction can be achieved from this viewpoint and durability is also improved.

Moreover, to smoothly perform engaging and engaging cancellation between the guiding ring gear 63 and the intermediate gear 91 via the cutout portion 64, it is preferable that modules for both the gears 63 and 91 are appropriately designed.

In the present embodiment, it has been explained that the system that performs a painting operation is employed as the robot system 3. The present embodiment is not limited to this. It is only sufficient that the system is made by appropriately combining the working robot 2 that performs a predetermined work operation and the carrier device 1 that has the configuration described above.

In other words, the carrier device 1 can place thereon the predetermined working robot 2 and includes the swivel arm 11 that passes between the carrying in and out position 40 and the working position 41 that are previously set on the circular orbit A while swiveling its leading ends. Moreover, the carrier device 1 includes the base 6 that can rotatably mount thereon the swivel arm 11 and is disposed on the installation surface 100. Moreover, the base 6 has the hollow structure and includes the hollow part 60 that has at least therein the center of rotation of the swivel arm 11, and predetermined linear objects can be inserted into through the hollow part 60. It is only sufficient that the present embodiment has the conditions.

Moreover, the carrier device 1 may not be necessarily used as the robot system 3 by the combination with a predetermined robot. It is only sufficient that the carrier device 1 includes the base 6 disposed on the installation surface 100, the base 6 has the hollow structure and includes the hollow part 60 that has at least therein the center of rotation of the swivel arm 11, and predetermined linear objects can be inserted into through the hollow part 60.

Moreover, the hollow structure of the base 6 may appropriately set the cross sectional shape and the size of the hollow part 60. At least it is only sufficient that linear objects such as cables can be inserted into through the hollow part.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carrier device comprising:
   a base that is disposed on an installation surface;
   a swivel arm that is provided on the base to swivel freely and of which turn tables attached to its both ends pass between a carrying in and out position and a working position that are previously set on a circular orbit, and the base having a hollow structure and including a hollow part that has at least therein a center of rotation of the swivel arm and into and through which a predetermined linear object is inserted;
   a swiveling mechanism that swivels the swivel arm in such a manner that the turn tables revolve around the base; and
   a table rolling mechanism that makes a specified turn table of the turn tables located at the working position rotate on its axis at a mounting position, wherein
   the swiveling mechanism includes:
      a first power source; and
      an arm swivel ring gear that is coupled with the first power source in an interlocking manner and is rotatably attached on an outer circumferential surface of the base along with the swivel arm,
   the table rolling mechanism includes:
      a second power source that is mounted to a first side of the base that is closer to the working position than an opposite second side of the base; and
      a table rotating shaft in which its leading end is coupled with the specified turn table in an interlocking manner and in which its bottom end is engagable with a guiding ring gear fixed to the outer circumferential surface of the base and that is provided with an intermediate gear coupled with a rotating shaft of the second power source in an interlocking manner and that swivels along with the swivel arm,
   a cutout portion that comes free from engaging with the intermediate gear is formed on a portion of the guiding ring gear close to the working position, and
   the table rotating shaft located at the first side close to the working position transmits an output of the second power source to the specified turn table while idling the intermediate gear inside the cutout portion.

2. The carrier device according to claim 1, wherein the first power source and the second power source are placed outside the base.

3. The carrier device according to claim 2, wherein the linear object includes at least an electric cable.

4. The carrier device according to claim 1, wherein the linear object includes at least an electric cable.

5. The carrier device according to claim 1, wherein the second power source is immovably mounted to the base, and is not provided on the swivel arm.

6. A robot system comprising:
   a robot; and
   a carrier device that includes a base and a swivel arm,
   the base being disposed on an installation surface, having a hollow structure, and including a hollow part that has at least therein a center of rotation of the swivel arm, the hollow part being configured to receive a predetermined linear object inserted through the hollow part,
   the swivel arm being provided on the base to swivel freely, in which turn tables attached to its both ends pass between a carrying in and out position and a working position that are previously set on a circular orbit,
   the robot being integrally attached at a substantially middle position of the swivel arm and processing a workpiece placed on a specified turn table of the turn tables located at the working position,
   the carrier device includes:
      a swiveling mechanism that swivels the swivel arm in such a manner that the turn tables revolve around the base; and
      a table rolling mechanism that makes the specified turn table rotate on its axis at a mounting position,
   the swiveling mechanism includes:
      a first power source; and
      an arm swivel ring gear that is coupled with the first power source in an interlocking manner and is rotatably attached on an outer circumferential surface of the base along with the swivel arm,
   the table rolling mechanism includes:
      a second power source that is mounted to a first side of the base that is closer to the working position than an opposite second side of the base; and
      a table rotating shaft in which its leading end is coupled with the specified turn table in an interlocking manner and in which its bottom end is engagable with a guiding ring gear fixed to the outer circumferential surface of the base and that is provided with an intermediate gear coupled with a rotating shaft of the second power source in an interlocking manner and that swivels along with the swivel arm,
   a cutout portion that comes free from engaging with the intermediate gear is formed on a portion of the guiding ring gear close to the working position, and
   the table rotating shaft located at the first side close to the working position transmits an output of the second power source to the specified turn table while idling the intermediate gear inside the cutout portion.

7. The carrier device according to claim 6, wherein the first power source and the second power source are placed outside the base.

8. The carrier device according to claim 7, wherein the linear object includes at least an electric cable.

9. The robot system according to claim 7, wherein the linear object is an electric cable for the robot.

10. The carrier device according to claim 6, wherein the linear object includes at least an electric cable.

11. The robot system according to claim 6, wherein the linear object is an electric cable for the robot.

12. The robot system according to claim 6, wherein the second power source is immovably mounted to the base, and is not provided on the swivel arm.

* * * * *